US010578636B2

(12) United States Patent
Charon (10) Patent No.: US 10,578,636 B2
(45) Date of Patent: Mar. 3, 2020

(54) ELECTRONIC DEVICE FOR DETECTING AN AIR FLOW

(71) Applicant: Airbus Operations S.A.S., Toulouse (FR)

(72) Inventor: Pierre Charon, Toulouse (FR)

(73) Assignee: Airbus Operations S.A.S. (FR)

( * ) Notice: Subject to any disclaimer, the term of this patent is extended or adjusted under 35 U.S.C. 154(b) by 273 days.

(21) Appl. No.: 15/827,158

(22) Filed: Nov. 30, 2017

(65) Prior Publication Data

US 2018/0172719 A1    Jun. 21, 2018

(30) Foreign Application Priority Data

Dec. 16, 2016  (FR) .................................... 16 62597

(51) Int. Cl.

| G01P 5/04 | (2006.01) |
|---|---|
| G01P 5/10 | (2006.01) |
| G01P 13/00 | (2006.01) |
| G01P 5/12 | (2006.01) |
| G01F 1/684 | (2006.01) |
| G01F 1/696 | (2006.01) |
| G01K 5/70 | (2006.01) |
| G01K 7/20 | (2006.01) |
| G01K 13/02 | (2006.01) |

(52) U.S. Cl.
CPC ................ *G01P 5/10* (2013.01); *G01F 1/684* (2013.01); *G01F 1/696* (2013.01); *G01K 5/70* (2013.01); *G01K 7/20* (2013.01); *G01K 13/02* (2013.01); *G01P 5/12* (2013.01); *G01P 13/0033* (2013.01)

(58) Field of Classification Search
CPC ................. G01P 5/00; G01P 5/04; G01P 5/07
See application file for complete search history.

(56) References Cited

U.S. PATENT DOCUMENTS 2,273,331 A * 2/1942 Rowerdink ............... G01F 1/26
                                                        73/861.58
3,201,990 A    8/1965 Wald
(Continued)

FOREIGN PATENT DOCUMENTS

| EP | 2 199 202 A2 | 6/2010 |
|---|---|---|
| FR | 2 333 123 A1 | 6/1977 |

OTHER PUBLICATIONS

FR 16 62597 Search Report dated Feb. 21, 2017.

*Primary Examiner* — Lisa M Caputo
*Assistant Examiner* — Alex T Devito
(74) *Attorney, Agent, or Firm* — Lerner, David, Littenberg, Krumholz & Mentlik, LLP (57) ABSTRACT

An electronic device for detecting an air flow includes at least one sensor having a pair of platelets, each platelet having an RTD and having one end fixed, the other end being free and overlapping the free end of the other platelet. A platelet is flexible so as to form a switch for an electrical circuit. An air flow with a speed higher than a predetermined speed makes the sensor go from a first state, corresponding to a closed switch, in which the free ends of the platelets are in contact, to a second state, corresponding to an open switch, in which said contact is broken. A detection module allows, for each sensor, a resistance of the electrical circuit to be measured, the resistance corresponding to the RTDs being connected in parallel when the switch is closed or to one of the RTDs when the switch is open.

8 Claims, 4 Drawing Sheets

(56) References Cited

U.S. PATENT DOCUMENTS 3,914,994 A * 10/1975 Banner .................... G01F 1/28
                                                        73/114.68
4,136,330 A    1/1979  Estaque
4,326,780 A    4/1982  Kim

* cited by examiner

ELECTRONIC DEVICE FOR DETECTING AN AIR FLOW

FIELD OF THE INVENTION

The present invention relates to the field of systems onboard an aircraft, and more particularly to that of systems for detecting overheating of an element of the aircraft (OverHeat Detection System).

BACKGROUND OF THE INVENTION

An aircraft comprises systems allowing the detection of a potential overheating of an element, such as an engine or a nozzle, where said overheating may be linked to an anomaly, for example a fire. It is common to use temperature sensors comprising a eutectic. A eutectic is a mixture of two pure bodies which melts and solidifies at a constant temperature, for example a mixture of water and salt. Such a mixture therefore goes from the solid state to the liquid state, and vice versa, at a predefined temperature. A sensor may take the form of a cable, comprising a conducting core and an envelope, which is also conducting. Inside of this cable, a eutectic is present between the core and the envelope. This eutectic is typically an electrical insulator when it is in the solid state, and becomes an electrical conductor in the liquid state. A water and salt mixture is commonly used, which mixture is an electrical conductor in the liquid state, the conductivity depending on the proportion of salt in the mixture. The central core is typically made of nickel, and the external envelope is typically a superalloy, in other words an alloy containing a large quantity of nickel and of chrome. An electrical voltage, typically a low-frequency alternating voltage, is applied between the central core and the external envelope. When the eutectic is in the solid state, no current can flow, the eutectic being an electrical insulator in this state. On the other hand, when a section of the cable is heated to a temperature such that the eutectic contained within the cable goes into the liquid state, an electrical current can flow between the central core and the external envelope. It is thus possible to detect this electrical current and to deduce from this that at least one section of the cable is being subjected to a temperature higher than the temperature of fusion of the eutectic.

This type of overheating detector, using a eutectic, has numerous drawbacks. First of all, the installation of such sensors in an aircraft poses numerous constraints owing to the rigidity of the detector cables. This rigidity is inherent to the necessity of having a central core and an external envelope composed of an electrically conducting material that can withstand high temperatures, very often a quite inflexible metal material. These cables thus frequently have constraints on the radius of curvature that they can take, particularly as regards the connectors allowing their connection to the overheat detection system. Such sensors must also be installed taking into account a potential expansion of the elements onto which they are mounted. On the other hand, the eutectic included in the sensor must be designed to withstand the environmental conditions specific to an aircraft, particularly vibrations. More generally, such sensors do not reveal at which point of the detector cable the overheating has occurred. Such sensors do not allow an overheating to be localized more precisely than on the cable, which may potentially be quite long.

It is therefore necessary to provide a system allowing these drawbacks to be overcome.

BRIEF SUMMARY OF THE INVENTION

The invention relates to an onboard electronic device for detecting an air flow, the electronic device comprises a support allowing passage of the air flow and at least one sensor disposed in the passage of the air flow, each sensor comprises at least one pair of platelets, each platelet comprising an RTD (resistance temperature detector) and having one end fixed to the support, the other end of said platelet being free and overlapping the free end of the other platelet of the pair of platelets, at least one platelet being flexible so as to form a switch for an electrical circuit, an air flow with a speed higher than a predetermined speed being able to make the sensor go from a first state, corresponding to the switch being closed, in which the free ends of the platelets overlapping one another are in contact, to a second state, corresponding to the switch being open, in which said contact is broken, the electronic device comprising a detection module allowing, for each sensor, an electrical resistance of the electrical circuit of the sensor to be measured between two predefined terminals, the electrical resistance measured corresponding to the RTDs of the sensor connected in parallel when the switch is closed or to only one of the RTDs of the sensor when the switch is open.

Advantageously, the electronic device for detecting an air flow allows a detection of an air flow of a certain temperature to be acquired by the measurement of the variation of the electrical resistances of the RTDs, while at the same time allowing an immediate detection of a high air flow, in other words with a speed greater than a predetermined speed, the measured resistance doubling immediately (if the two RTDs are chosen to be equal). A plurality of sensors furthermore allows a precise localization of the air flow.

According to one complementary embodiment of the invention, the electronic device is designed to determine an estimation of a speed of the air flow as a function of the variation profile of at least one electrical resistance measured over time.

Advantageously, the electronic device can determine a speed of an air flow based on measurements of at least one electrical resistance of a sensor over time. This is because the speed of variation of the temperature of a sensor, and hence of its electrical resistance, is linked to the speed of the air flow.

According to one complementary embodiment of the invention, each platelet is composed of an electrically-conductive and flexible material, each platelet forming a part of the electrical circuit.

According to one complementary embodiment of the invention, each platelet forms a bimetallic strip, the free ends of the platelets of a sensor being in contact and pre-stressed at a first predetermined temperature, the contact between the two free ends being broken at a second predetermined temperature, the second temperature being higher than the first temperature.

According to one complementary embodiment of the invention, the detection module comprising a multiplexer allows each sensor to be connected to a Wheatstone bridge.

According to one complementary embodiment of the invention, the electronic device comprises a first and a second detection module allowing an electrical resistance of the electrical circuit of each sensor to be measured, the first detection module, referred to as 'normal', being connected to one platelet of the pair of platelets of the sensor, the second detection module, referred to as 'redundant', being connected to the other platelet of said pair of platelets, the electrical resistance measured by each detection module corresponding to the RTDs of the sensor connected in parallel when the switch is closed or to one of the RTDs of the sensor for the first detection module and to the other RTD for the second detection module when the switch is open.

The invention also relates to a method for estimating an air flow, the method being implemented by an electronic device for detecting an air flow such as described in this document, the method comprising the steps for:
  determining, at a first time, a first electrical resistance,
  determining, at a second time, a second electrical resistance,
    estimating an air flow as a function of the ratio of the difference between the second resistance and the first resistance and the difference between the second time and the first time.

The invention also relates to a computer program, which may be stored on a medium and/or downloaded from a communications network, in order to be read by a processor. This computer program comprises instructions for implementing all or part of the steps of the method for estimating an air flow mentioned in this document, when said program is executed by the processor.

The invention also relates to a means for storing information comprising such a computer program.

BRIEF DESCRIPTION OF THE DRAWINGS

The aforementioned characteristics of the invention, together with others, will become more clearly apparent upon reading the following description of one exemplary embodiment, said description being presented in relation with the appended drawings, amongst which.

DETAILED DESCRIPTION

Figure 1:
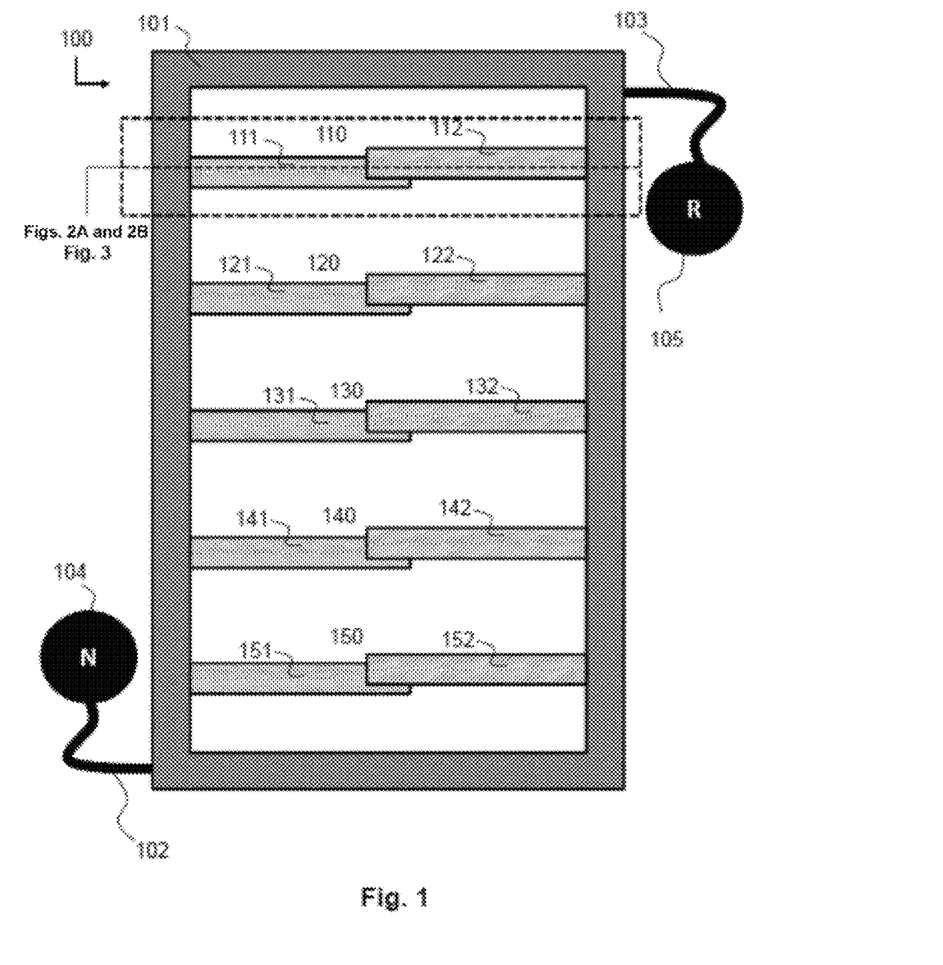
FIG. 1 illustrates schematically an onboard electronic device for detecting an air flow, the electronic device comprising a support allowing a passage of the air flow and sensors disposed in the passage of the air flow, according to one embodiment of the invention.

FIG. 1 illustrates schematically an onboard electronic device 100 for detecting an air flow, the electronic device 100 comprising a support 101 allowing a passage of the air flow and sensors 110, 120, 130, 140 and 150 disposed in the passage of the air flow, according to one embodiment of the invention.

The support 101 is typically designed to be fixed around a ventilation outlet potentially allowing the passage of a flow of a fluid, for example of hot air. Each sensor 110, 120, 130, 140 and 150 comprises at least one pair of platelets respectively "111 and 112", "121 and 122", "131 and 132", "141 and 142" and "151 and 152", each platelet comprising an RTD (not illustrated here) and having one end fixed to the support 101, the other end of said platelet being free and overlapping the free end of the other platelet of the pair of platelets, at least one platelet being flexible so as to form a switch for an electrical circuit, an air flow with a speed higher than a predetermined speed being able to make the sensor go from a first state, corresponding to the switch being closed, in which the free ends of the overlapping platelets are in contact, to a second state, corresponding to the switch being open, in which said contact is broken. According to the embodiment, the number of sensors used can vary. A larger number of sensors allows a potential leakage of hot air to be better localized.

In other words, each sensor 110, 120, 130, 140 or 150 comprises two platelets, each being fixed by one end onto the support 101. The platelets are for example fixed on either side of the passage of the air flow, in other words inside, on opposite sides of the support 101. The free ends of the platelets overlap and are in contact. Since at least one of the two platelets is flexible, by the pressure exerted on the flexible platelet, an air flow can deform said platelet sufficiently for the contact between the two platelets to be broken. This allows a switch to be formed, the switch being closed when the air flow is low, in other words has a low speed, meaning below a predetermined speed. Indeed, in this case, the pressure exerted is not enough to sufficiently force the two platelets apart. The switch opens when the air flow is strong, in other words has a speed higher than the predetermined speed. It is possible to define the predetermined speed triggering the opening of the switch by modifying the cross-section of the platelets, in order to offer more or less resistance to the air flow, or else by adjusting the flexibility of the platelets. According to one embodiment, both platelets of each sensor are flexible.

The electronic device 100 for detecting an air flow comprises a cabling 102 allowing each sensor 110, 120, 130, 140 and 150 to be connected to a detection module 104. It is possible for the electronic device 100 for detecting an air flow to comprise a second cabling 105 allowing a second detection module 105 to be connected. In this case, a redundancy is obtained, the first detection module 104, referred to as "normal", being backed up by the second detection module 105, referred to as "redundant". This allows a potential fault in the cabling 102 or 103, or else a potential fault in the detection module 104 or 105 to be overcome.

The detection module 104 or 105 allows, for each sensor 110, 120, 130, 140 and 150, an electrical resistance of the electrical circuit of said sensor to be measured between two predefined terminals, the electrical resistance measured corresponding to the RTDs of the sensor connected in parallel when the switch is closed or to only one of the RTDs of the sensor when the switch is open. The two predefined terminals typically correspond, on the one hand, to a ground of the electronic device 100 and, on the other hand, to a terminal of an RTD.

According to one embodiment, the cabling 102 is connected to each sensor 110, 120, 130, 140 and 150 via a connection formed on the left-hand side of the support 101 and the cabling 103 via a connection on the right-hand side of the support 101. Accordingly, and as described hereinafter, when a switch of a sensor is open, the detection module 104, referred to as "normal", measures the electrical resistance of the RTD included on the left platelet of the sensor (for example the platelet 111, 121, 131, 141 or 151). Similarly, when a switch of a sensor is open, the detection module 105, referred to as "redundant", measures the electrical resistance of the RTD included on the right platelet of the sensor (for example the platelet 112, 122, 132, 142 or 152).

Thus, according to one embodiment, the detection module 104, referred to as "normal", respectively the detection module 105, referred to as "redundant", is connected, via the cabling 102, respectively 103, to each sensor 110, 120, 130, 140 and 150. The detection module 104, respectively 105, possibly comprises a multiplexer in order to avoid all the sensors being connected to one another and in order to enable an individual measurement of the electrical resistance of each sensor 110, 120, 130, 140 and 150.

According to one embodiment, each platelet of a sensor 110, 120, 130, 140 and 150 is formed from an electrically-conductive and flexible material, each platelet forming a part of the electrical circuit of said sensor.

In the representation of the platelets shown in FIG. 1, for a better understanding, the platelets of each pair of platelets of the sensors 110, 120, 130, 140 and 150 are shown slightly offset. According to another embodiment, the platelets overlap while being exactly superposed onto each other.

According to one complementary embodiment of the invention, each platelet is composed of a bimetallic strip. The free ends of the platelets of a sensor are in contact, and are pre-stressed, at a first predetermined temperature, the contact between the two free ends being broken at a second predetermined temperature, the second temperature being higher than the first temperature. In other words, each platelet is a bimetallic strip, meaning that each platelet has a tendency to deform in one direction or another according to the variation of the temperature. The platelets are disposed in such a manner that the free ends of the platelets are in contact and are pre-stressed at a predetermined temperature, typically a temperature of use of the electronic device 100 referred to as "normal". A temperature referred to as "normal", or "ambient", is a temperature at which the electronic device 100 is used in the absence of a flow of hot air. The free ends of the platelets of one or more sensor(s) 110, 120, 130, 140 and 150 are brought into contact and are pre-stressed so that the contact between these free ends is not broken with the slightest rise in temperature. The forces of deformation of the bimetallic strips due to the rise in the temperature must exceed the pre-stressing force for the contact to be broken. The platelets are also disposed in such a manner that an increase in temperature tends to move the free ends of the platelets apart from one another, the contact being broken between the two free ends when a predetermined temperature, referred to as "contact break" temperature, higher than the ambient temperature referred to as "normal", is reached.

Thus, according to this embodiment of the invention, the contact between two free ends of the platelets of a sensor 110, 120, 130, 140 and 150 may be broken according to one and/or the other of the following reasons:

the speed of an air flow, by the pressure of the air flow exerted on each platelet, deforms the two flexible platelets and moves the two free ends apart, allowing the contact to be broken, and/or, the increase in temperature gives rise to the deformation of the platelets, each platelet being a bimetallic strip, the deformation of each platelet allowing the contact to be broken.

Thus, an air flow with a high speed and high temperature causes an abrupt break in the contact between the free ends of the platelets of a sensor. The instantaneous variation in the electrical resistance of the sensor when the contact is broken enables this air flow to be quickly detected. The fact that each platelet is a bimetallic strip and is composed of flexible materials thus allows a synergy between the two effects. Moreover, this allows a redundancy for the detection of an air flow, the contact being able to be broken by the air flow even if the bimetallic strips do not work. This is the case for example if said air flow is at a temperature referred to as "normal" or "ambient", or more generally, at a temperature below the temperature referred to as the "contact break" temperature.

Figure 2A:
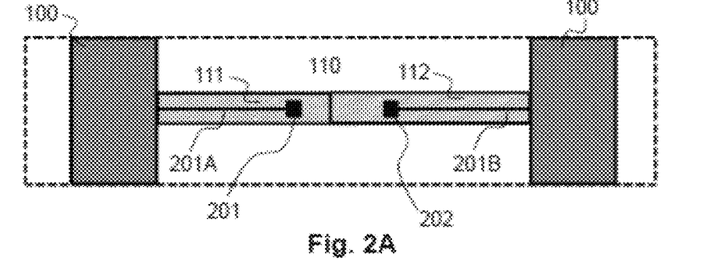
FIGS. 2A and 2B illustrate schematically a view of a sensor of an onboard electronic device for detecting an air flow, according to two embodiments of the invention.
Figure 2B:
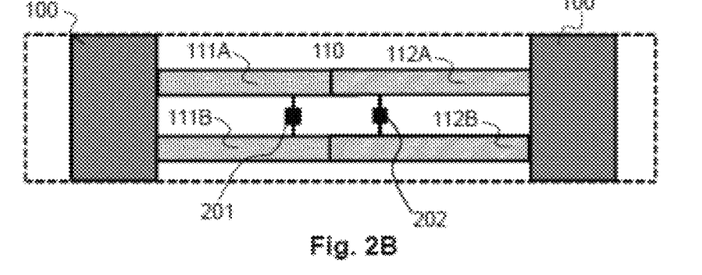

FIGS. 2A and 2B illustrate schematically a view of a sensor 110 of an onboard electronic device 100 for detecting an air flow, according to two embodiments of the invention. FIGS. 2A and 2B may also just as easily correspond to the sensors 120, 130, 140 or 150. Considering that FIG. 1 is a face-on view of the electronic device 100 for detecting an air flow, FIGS. 2A and 2B are also face-on views of the sensor 110. In other words, FIGS. 2A and 2B are more accurate views of FIG. 1 allowing two architectures of the sensor 110 to be detailed according to the same view.

FIG. 2A illustrates schematically a view of a sensor 110 of an onboard electronic device 100 for detecting an air flow, according to one embodiment of the invention. In this embodiment, the sensor 110 comprises a pair of platelets 111 and 112, disposed face to face. One end of the platelet 111 is fixed to the support 100 on its left-hand side, and one end of the platelet 112 is fixed to the support 100 on its right-hand side. The two free ends of the platelets 111 and 112 overlap while being in contact in the normal situation, in other words with no air flow.

Each platelet 111 and 112 comprises an RTD, respectively RTD 201 and RTD 202. Each RTD 201 and 202 is typically a platinum resistance, for example a platinum resistance thermometer called a "Pt100". According to one embodiment, a thermistor, or any element whose electrical resistance varies as a function of the temperature, is used in place of an RTD. Each RTD 201 and 202 comprises two output connectors. One output connector from each RTD is connected (points C and D in FIG. 4 hereinafter) to the ground of the electronic device 100 for detecting an air flow, for example via the cable 201A, respectively 201B. The cables 201A and 201B are isolated in order not to create any short-circuit with each platelet 111 and 112. The other output connector is connected to the platelet, the platelet being made of an electrically-conductive material. Thus, the RTD 201, respectively 202, is connected, on the one hand, to ground via the electrical cable 201A, respectively 201B, and on the other hand, to the platelet 111, respectively 112. Each platelet is for example composed of a flexible and electrically-conductive material, typically steel. According to this embodiment, the platelet 111 is connected (point A in FIG. 4 hereinafter) to the detection module 104 via the cabling 102. If a redundant detection module 105 is used, the platelet 112 is connected (point B in FIG. 4 hereinafter) to this redundant detection module 105 via the cabling 103. Each detection module 104 and 105 is connected to the ground of the electronic device 100 for detecting an air flow.

According to one embodiment, a platelet is composed of a flexible metal support onto which an insulating substrate is deposited. A layer of platinum is deposited onto the insulating substrate, and a point of contact between the layer of platinum and the metal support is created, typically toward the free end of the platelet.

FIG. 2B illustrates schematically a view of a sensor 110 of an onboard electronic device 100 for detecting an air flow, according to another embodiment of the invention. In this embodiment, the sensor 110 comprises a pair of platelets, disposed face to face, each platelet being composed of two sub-platelets 111A, 111B, 112A and 112B. One end of each sub-platelet 111A, and 111B is fixed to the support 100, on its left-hand side, one end of each sub-platelet 112A and 112B is fixed to the support 100, on its right-hand side. The free ends of the sub-platelets 111A, 111B, 112A and 112B overlap while being in contact in the normal situation, in other words with no air flow. The sub-platelets are composed of a flexible and electrically-conductive material. The RTD 201, respectively 202, is connected, on the one hand, to the sub-platelet 111A, respectively 112A, and on the other hand, to the sub-platelet 111B, respectively 112B. The sub-platelets 111B and 112B are typically connected to the ground of the electronic device 100 for detecting an air flow. The sub-platelet 111A is typically connected to the detection module 104 via the cable 102. If a redundant detection module 105 is used, the sub-platelet 112A is connected to this redundant detection module 105 via the cabling 103. Each detection module 104 and 105 is connected to the ground of the electronic device 100 for detecting an air flow.

In FIGS. 2A and 2B, an air flow with a speed higher than a predetermined speed can make the sensor 110 go from a first state, corresponding to the switch being closed, in which the overlapping free ends of the platelets 111 and 112, respectively 111A and 112A or 111B and 112B, are in contact, to a second state, corresponding to the switch being open, in which said contact is broken. Such an air flow 300 is illustrated hereinafter in FIG. 3.

Figure 3:
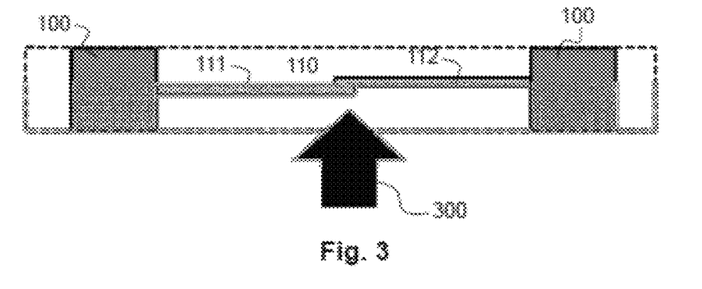
FIG. 3 illustrates schematically another view of a sensor of an onboard electronic device for detecting an air flow, according to one embodiment of the invention.

FIG. 3 illustrates schematically another view of a sensor of an onboard electronic device 100 for detecting an air flow, according to one embodiment of the invention. FIG. 3 corresponds to a profile view of the electronic device 100 for detecting an air flow illustrated in FIG. 1, more precisely to a profile view of a sensor 110 such as illustrated in FIG. 2A. In this FIG. 3, the overlapping of the platelets 111 and 112 is shown, the platelet 112 being on top of the platelet 111. The two platelets are in contact in the normal situation, in other words with no air flow. An air flow 300 may come from under the support 101. The stronger the flow of air, the more the platelets 111 and 112, which are flexible, will tend to bend upward, up to a point such that the contact between the platelets will be broken.

Figure 4:
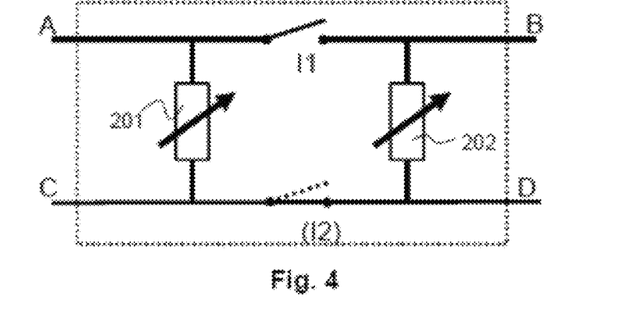
FIG. 4 illustrates schematically an electrical circuit of a sensor of an onboard electronic device for detecting an air flow, according to one embodiment of the invention.

FIG. 4 illustrates schematically an electrical circuit of a sensor 110 (or 120, 130, 140 and 150) of an onboard electronic device 100 for detecting an air flow, according to one embodiment of the invention. "I1" represents the switch formed by the contact—or the non-contact—of the platelets 111 and 112. The points C and D are typically connected to the ground of the electronic device 100 for detecting an air flow, possibly via the cables 201A and 201B. The point A corresponds to the platelet 111, the point B to the platelet 112. The switch "I2" corresponds to the embodiment illustrated in FIG. 2B, in which the sub-platelets 111B and 112B, connected to ground, may break their contact. This switch "I2" is absent in the embodiment illustrated in FIG. 2A. Thus, when the switch "I1" is closed (platelets 111 and 112 in contact), the electrical resistance between the points A and C (or the points B and D) is that of the RTDs 201 and 202 placed in parallel. On the other hand, when the switch "I1" is open (contact between the platelets broken under the pressure of an air flow 300 with a speed higher than a predetermined speed), the electrical resistance between the points A and C is that of the RTD 201, and the electrical resistance between the points B and D is that of the RTD 202.

Figure 5:
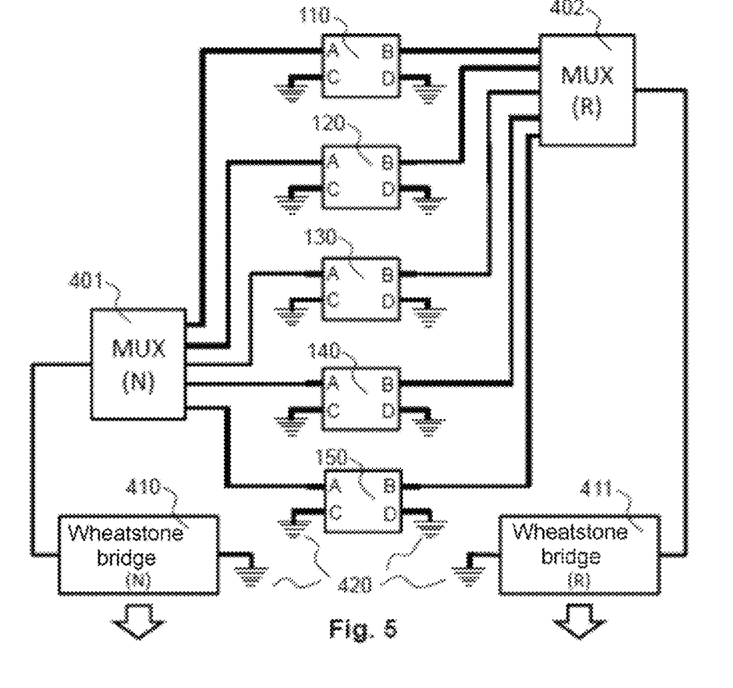
FIG. 5 illustrates schematically an onboard electronic device for detecting an air flow, according to one embodiment of the invention.

FIG. 5 illustrates schematically an onboard electronic device 100 for detecting an air flow, according to one embodiment of the invention.

In this FIG. 5, the sensors 110, 120, 130, 140 and 150 are similar to the sensor illustrated in FIG. 4. The detection module 104 is shown as comprising a multiplexer 401 and a Wheatstone bridge 410 in order to be able to measure the electrical resistance of each sensor 110, 120, 130, 140 and 150 independently. The redundant detection module 105, which is optional, is shown as comprising a multiplexer 402 and a Wheatstone bridge 411 in order to be able to measure the electrical resistance of each sensor 110, 120, 130, 140 and 150 independently. According to one embodiment, the multiplexers 401 and 402 are synchronized so as not to allow a measurement of the electrical resistance of the same sensor at the same time by the two Wheatstone bridges 410 and 411. Any device other than a Wheatstone bridge may be used in order to determine the electrical resistance of a sensor.

Figure 6:
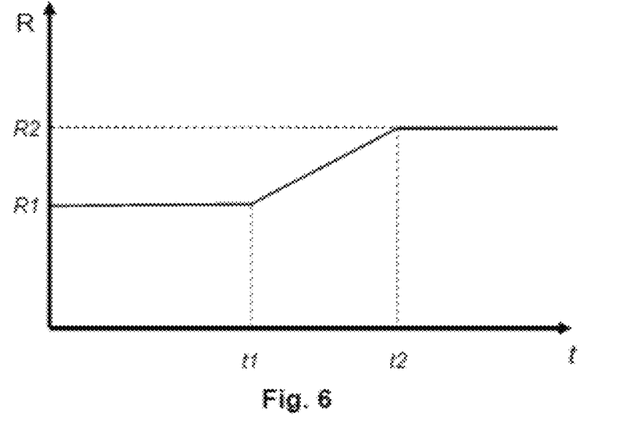
FIG. 6 illustrates a first example of measurements of the resistance of a sensor of an onboard electronic device for detecting an air flow, according to one embodiment of the invention.

FIG. 6 illustrates a first example of measurements of the resistance of a sensor of an onboard electronic device 100 for detecting an air flow, according to one embodiment of the invention.

The abscissa axis represents time "t", the ordinate axis the electrical resistance "R" of a sensor measured by the detection module 104 or 105.

In this example, RTDs 201 and 202 are chosen to be identical, the electrical resistance of each RTD increasing under the effect of the temperature.

Under normal conditions, prior to the time "t1", the temperature of the electronic device 100 is that of the ambient temperature, the temperature of the electronic device 100 is stable, the electrical resistance measured is therefore stable and has the value "R1". At the time "t1", a leakage occurs, resulting in a flow of hot air, in other words an air flow at a temperature higher than the ambient temperature. The sensors subjected to the flow of hot air, see their temperature increase, the resistance of the RTDs 201 and 202 therefore increases with time. This electrical resistance increases until the time "t2" where the temperature of the RTDs 201 and 202 stabilizes at the temperature of the flow of hot air. The electrical resistance measured from "t2" is therefore stable and has a value "R2". In this example in FIG. 6, the speed of the air flow does not allow the contact between the platelets 111 and 112 to be broken; the measured electrical resistance ("R1" or "R2") therefore corresponds to the value of the RTDs 201 and 202 placed in parallel. In other words, since the two RTDs are identical, "R1" is equal to half the electrical resistance of the RTD 201 or 202 at ambient temperature. Similarly, "R2" is equal to half the electrical resistance of the RTD 201 or 202 placed at the temperature of the flow of hot air.

Given a calibration or a knowledge of the technical characteristics of the RTDs 201 and 202, the knowledge of the measured electrical resistance allows, using this, either the ambient temperature to be deduced from "R1", or the temperature of the flow of hot air to be deduced from "R2".

Given a calibration, the calculation of the slope of the curve of variation of the electrical resistance between the times "t1" and "t2" allows a measurement of the flow of hot air to be deduced from this, in other words from the speed of the hot air. In other words, the higher the flow of hot air, the faster the sensor will reach the final temperature of the flow of hot air, in other words, the faster the measured electrical resistance will reach the value "R2".

If "D" is the slope of the curve of variation over time, then:

$$D = \frac{(R2 - R1)}{(t2 - t1)}$$

It is then possible, with one or more calibration steps, to obtain an evaluation or estimation of an air flow using the measured value of "D". In other words, an evaluation of the speed and of the temperature of an air flow may be obtained based on the determination of "D". The operation for calibrating a sensor may comprise measurements of the time behavior of the electrical resistance of a sensor subjected to an air flow of predetermined speed and of predetermined temperature.

According to one embodiment of the invention, the onboard electronic device 100 for detecting an air flow comprises a module designed for determining an estimation of an air flow as a function of the variation of the measurement(s) of the electrical resistance of one or more sensor(s) 110, 120, 130, 140 or 150 as a function of time. The estimation of the air flow may be made by determining the value of the parameter "D" corresponding to the slope of the curve of variation of the measured electrical resistance over time. It is in particular possible to determine an estimation of the speed of the air flow. For a given temperature of the air flow, the higher the speed of the air flow, the shorter the duration "t2−t1".

Thus, the electronic device 100 may be designed to execute a method for estimating an air flow, the method being implemented by the electronic device 100 and comprising the steps for:

determining, at a first time "t1", a first electrical resistance "R1",
determining, at a second time "t2", a second electrical resistance "R2",
estimating a flow of air as a function of the parameter "D" such as previously defined, in other words the ratio between the difference between the second resistance "R2" and the first resistance "R1" and the difference between the second time "t2" and the first time "t1".

Figure 7:
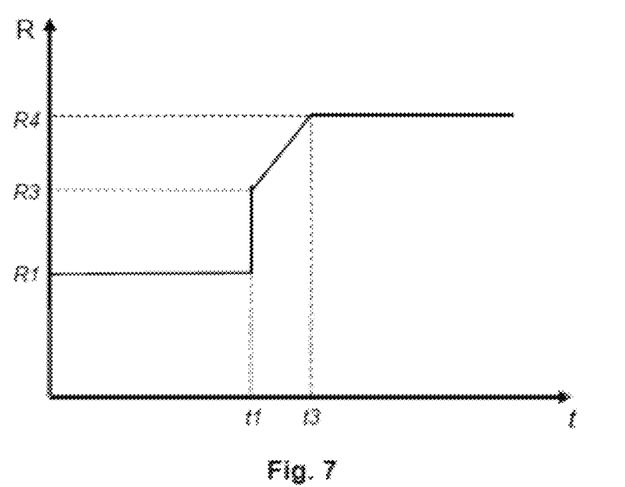
FIG. 7 illustrates a second example of measurements of the resistance of a sensor of an onboard electronic device for detecting an air flow, according to one embodiment of the invention.

FIG. 7 illustrates a second example of measurements of the resistance of a sensor of an onboard electronic device 100 for detecting an air flow, according to one embodiment of the invention. This example is similar to that given in FIG. 6 except that, in this example in FIG. 7, the flow of hot air has a higher speed than the predetermined speed allowing the contact between the platelets 111 and 112 to be broken. Thus, at the time "t1", the air flow causes the opening of the switch "I1". The electrical resistance measured then goes from that of the RTDs 201 and 202 in parallel ("R1") to a single RTD ("R3"). Since the RTDs 201 and 202 are identical, "R3" therefore has a value that is twice the value of "R1". The leakage of a flow of hot air at a speed higher than the predetermined speed allowing the opening of the switch "I1" therefore has the immediate effect of a doubling of the measured electrical resistance. The electronic device 100 therefore allows an immediate detection of a leakage of a "fast" air flow, in other words at a speed higher than the predetermined speed allowing the contact between the platelets 111 and 112 to be broken. It should be noted that this detection of a "fast" flow is independent of the temperature of the air flow. The electronic device 100 can therefore detect any leakage of an air flow if its speed is higher than the predetermined speed allowing the contact between the platelets 111 and 112 to be broken, independently of the temperature of the air flow. In the example illustrated in FIG. 7, the temperature of the air flow is higher than the ambient temperature, the resistance measured by the detection module 104 or 105 will therefore increase until it reaches, at the time "t3", the electrical resistance corresponding to the temperature of the air flow. In a similar manner to what has been described for FIG. 6, the slope of the curve between the time "t1" and the time "t2", with the passage of the measured electrical resistance from the value "R3" to the value "R4", given a prior calibration, allows the strength of the air flow, in other words its speed, to be evaluated.

It should be noted that since the cross-sectional area defined by the support 101 is known and constant, an air flow rate is defined by the speed of the air flow multiplied by said cross-section area.

More generally, the electronic device 100 for detecting an air flow may comprise, possibly connected via a communications bus: a processor or CPU (Central Processing Unit); a memory of type RAM (Random Access Memory) and/or ROM (Read Only Memory), a storage module of the internal storage type, a communications module and possibly one or more modules of various natures, for example an analog-digital converter. The communications module is designed to allow the electronic device 100 to send a message comprising for example a measured electrical resistance, possibly in a periodic manner or when there is a variation of the measured value. The message may be sent to an onboard avionics system in an aircraft. The electronic device 100 may comprise an integrated circuit typically comprising the processor CPU, the memory of the RAM type, the communications module and an analog-digital converter. The analog-digital converter allows the measurements of electrical resistance to be converted into a digital format in order to facilitate the processing.

The processor of the electronic device 100 for detecting an air flow is capable of executing instructions loaded into the memory, for example from the storage module or from the communications module. When the electronic device 100 for detecting an air flow is powered up, the processor is designed to read instructions from the memory and to execute them. These instructions form a computer program causing the implementation, by the processor, of all or part of the processes and steps of a method for detecting an air flow implemented by the electronic device 100 for detecting an air flow. Thus, all or part of the processes and steps of such a method may be implemented in the form of software by execution of a set of instructions by a programmable machine, such as a DSP (Digital Signal Processor) or a microcontroller. All or part of the processes and steps may also be implemented in the form of hardware by a machine or a dedicated component, such as an FPGA (Field-Programmable Gate Array) or an ASIC (Application-Specific Integrated Circuit).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An onboard electronic device for detecting an air flow, the electronic device comprising:
    a support allowing a passage of the air flow;
    at least one sensor disposed in the passage of the air flow, wherein each sensor comprises at least one pair of platelets, each platelet comprising an RTD and having one end fixed to the support, another end of said platelet being free and overlapping the free end of the other platelet of the pair of platelets, at least one platelet being flexible so as to form a switch for an electrical circuit,
    wherein an air flow with a speed higher than a predetermined speed being able to make the sensor go from a first state, corresponding to the switch being closed, in which the free ends of the overlapping platelets are in contact, to a second state, corresponding to the switch being open, in which said contact is broken,
    the electronic device further comprises a first detection module allowing, for each sensor, an electrical resistance of the electrical circuit of the sensor to be measured between two predefined terminals, the electrical resistance measured corresponding to the RTDs of the sensor connected in parallel when the switch is closed, or to only one of the RTDs of the sensor when the switch is open.

2. The electronic device as claimed in claim 1, wherein the electronic device is configured for determining an estimation of a speed of the air flow as a function of the variation profile of at least one electrical resistance measured over time.

3. The electronic device as claimed in claim 1, wherein each platelet is made from an electrically-conducting and flexible material, each platelet forming a part of the electrical circuit.

4. The electronic device as claimed in claim 3, wherein each platelet forms a bimetallic strip, the free ends of the platelets of a sensor being in contact with a pre-stress at a first predetermined temperature, the contact between the two free ends being broken at a second predetermined temperature, the second temperature being higher than the first temperature.

5. The electronic device as claimed in claim 1, wherein the first detection module comprises a multiplexer allowing each sensor to be connected to a Wheatstone bridge.

6. The electronic device as claimed in claim 1, wherein the electronic device further comprises a second detection module allowing an electrical resistance of the electrical circuit of each sensor to be measured, the first detection module, referred to as 'normal', being connected to one platelet of the pair of platelets of the sensor, the second detection module, referred to as 'redundant', being connected to the other platelet of said pair of platelets, the electrical resistance measured by each detection module corresponding to the RTDs of the sensor connected in parallel when the switch is closed or to one of the RTDs of the sensor for the first detection module and to the other RTD for the second detection module when the switch is open.

7. A method for estimating an air flow, the method being implemented by an electronic device (100) as claimed in claim 1, the method comprising:
    determining, at a first time, a first electrical resistance;
    determining, at a second time, a second electrical resistance; and
    estimating an air flow as a function of the ratio between the difference between the second resistance and the first resistance and the difference between the second time and the first time.

8. A non-transitory computer-readable medium storing instructions for implementing, by a processor of an electronic device, the method allowing the estimation of an air flow as claimed in claim 7, when said computer program is executed by said processor.

* * * * *